UNITED STATES PATENT OFFICE.

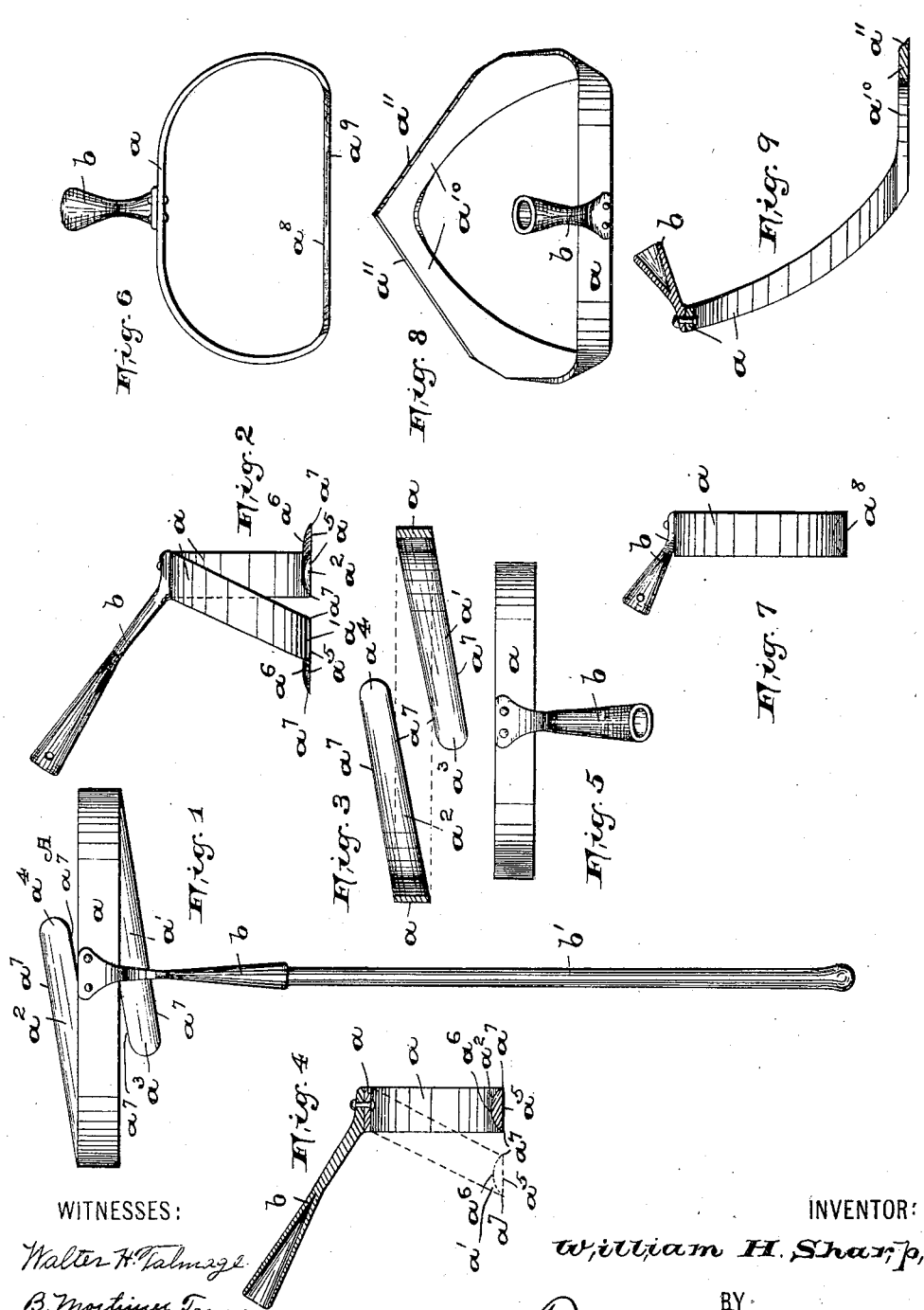

WILLIAM H. SHARPE, OF SHARPES, FLORIDA.

CULTIVATING-TOOL.

SPECIFICATION forming part of Letters Patent No. 629,475, dated July 25, 1899.

Application filed July 28, 1898. Serial No. 687,072. (No model.)

*To all whom it may concern:*

Be it known that I, WILLIAM H. SHARPE, a citizen of the United States, residing at Sharpes, in the county of Brevard and State of Florida, have invented certain new and useful Improvements in Cultivating Tools or Implements; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has reference to a novel construction of cultivating tool or implement; and the invention has for its principal object to provide a simply-constructed and cheaply-made implement or tool of the character to be hereinafter fully set forth which can be manipulated with the greatest of ease and with better results than the construction of cultivating-tools of a like nature now in general use.

Other objects of this invention are to provide a construction of implement or tool, to be used more especially as a hoe, which when drawn over the ground pulverizes better than the hoes as now made and leaves the ground-surface perfectly level and smooth. Furthermore, owing to the flat arrangement of the cutting or scraping blade of the implement, grass, weeds, and roots are cut with the least resistance, the sharp edge or edges with which the cutting is done giving a minimum of resistance, and such weeds and the like are left spread on top of the ground exposed directly to the sun, whereby the weeds and grass cut in this manner die more quickly than when partly covered with the dirt scraped up with the old forms of hoes or implements of a similar character.

A further advantage is that the implement or tool can easily be kept sharp, and owing to its shape, the cutter part being flat and lying close to the ground, it can be run close to rows of corn, cotton, or any other plant, however small and weak, without covering the plant with earth.

As a cultivator my novel form of tool is of great advantage in orange-groves. These trees require shallow and level culture, and my novel construction of hoe is peculiarly adapted for this purpose, as it leaves the ground in a smooth and good condition. Furthermore, the implement having a sharp cutting edge and the line of cutting being directly in line with the pull or push exerted by the manipulator of the tool, it cuts heavy weeds, bushes, roots, &c., and saves grubbing.

Many other objects of this invention not here specifically enumerated will be evident from the following description of the cultivating tool or implement.

My invention therefore consists in the novel and general construction and form of cultivating tool or implement to be hereinafter more fully set forth; and the invention consists, furthermore, in such novel arrangements and combinations of parts comprising the tool, all of which will be fully described in the following specification and finally embodied in the clauses of the claim forming a part thereof.

The invention is clearly illustrated in the accompanying sheet of drawings, in which—

Figure 1 is a top view of one form of cultivating tool or implement made according to the principles of my present invention. Fig. 2 is a side view of the same; and Figs. 3 and 4 are horizontal and vertical sections, respectively, of the tool illustrated in said Figs. 1 and 2. Figs. 5 and 6 are a top and end view, respectively, of a cultivating tool or implement of a modified form of construction, but still embodying the leading features of my invention; and Fig. 7 is a side view of the same. Fig. 8 is a top or plan view of a cultivating tool or implement of still another modified form of construction, and Fig. 9 is a longitudinal vertical section of the same.

Similar letters of reference are employed in all of the said above-described views to indicate corresponding parts.

In said drawings, A indicates the complete tool, the construction illustrated in Figs. 1 to 4, inclusive, representing an ordinary garden-hoe. In this construction the tool proper comprises a band or strip of metal $a$, preferably cast-steel, which is preferably of an elliptical shape when viewed from either end and has a pair of end portions $a'$ and $a^2$, which are arranged to extend on opposite sides of the main body portion of the tool or implement and have their end portions $a^3$ and $a^4$ extending past each other and approximately parallel, as clearly indicated in Figs. 1 and 3. The under surface $a^5$ of each end or arm portion $a'$ and $a^2$ is made flat, so as to lie close to the ground; but the upper surface of said end or arm portions is curved, as at $a^6$, and the same is provided with sharp cutting edges $a^7$, whereby the device is especially adapted for the cutting of weeds, grass, roots, and bushes, as will be clearly evident.

From an inspection more especially of Fig. 3 it will be seen that owing to the arrangement of the end or arm portions $a'$ and $a^2$ when the tool or implement is drawn forward or pushed backward over the ground a complete and direct cutting edge and an efficient earth-loosening surface are presented, which permits a person to manipulate the device with the greatest ease and comfort, as the resistance offered has thus been reduced to a minimum. Secured upon the top of the band or strip $a$ in any well-known manner is a socket $b$, which is provided with the usual form of handle, as $b'$, for manipulating the device.

In the construction of cultivating tool or implement illustrated in Figs. 5, 6, and 7 I have dispensed with the free end or arm portions $a'$ and $a^2$, the body portion $a$ of the tool or implement being curved, as shown in Fig. 6, and each curved part of the same terminating in a flat cutting portion $a^8$, which is provided with the cutting edges $a^9$, as indicated in dotted outline in Fig. 7, the said body portion $a$ and the portion $a^8$ all being formed in one continuous piece, as will be clearly understood from an inspection of said Fig. 6.

If desired, the lower part of the tool or implement may be made with a forwardly-extending cutting portion $a^{10}$, which is provided with a pair of angularly-arranged cutting edges $a^{11}$, all of which is clearly illustrated in Figs. 8 and 9.

From the above description it will be seen that I have devised a simple and operative tool or implement which can be put to many uses, but which is especially adapted for use as a hoe; but the tool or implement, with slight changes in the means of attachment, can also be used in connection with a plow or other cultivator, as will be clearly evident.

I am aware that changes may be made in the details of the construction of the device without departing from the general principles of the invention herein set forth. Hence I do not limit my invention to the exact details of the construction of the tool or implement as herein set forth, and illustrated in the accompanying drawings.

Having thus described my invention, what I claim is—

1. A cultivating tool or implement, consisting, essentially, of a main body $a$, of an elliptical or similar shape, and a pair of cutting or scraping end portions $a'$ and $a^2$, each provided with a cutting edge or edges, and said cutting or scraping portions having their end portions extending past each other and approximately parallel, substantially as and for the purposes set forth.

2. A cultivating tool or implement, consisting, essentially, of a main body $a$, of an elliptical or similar shape, and a pair of cutting or scraping end portions $a'$ and $a^2$, inclining on opposite sides of said main body, and a cutting edge or edges on each portion $a'$ and $a^2$, and said cutting or scraping portions having their end portions extending past each other and approximately parallel, substantially as and for the purposes set forth.

In testimony that I claim the invention set forth above I have hereunto set my hand this 18th day of July, 1898.

WILLIAM H. SHARPE.

Witnesses:
JOHN HENRY,
MINOR S. JONES.